United States Patent [19]

Nakayama et al.

[11] Patent Number: 5,019,956
[45] Date of Patent: May 28, 1991

[54] POWER CONTROL APPARATUS

[75] Inventors: Katsutoyo Nakayama; Toshimichi Morii, both of Tokyo; Toshihide Kamino, Osaka, all of Japan

[73] Assignees: Ohbayashi Corporation, Osaka; Morii Dengyo Kabushi Kaisha, Tokyo; Terasaki Denki Sangyo, Osaka, all of Japan

[21] Appl. No.: 436,211

[22] Filed: Nov. 14, 1989

[30] Foreign Application Priority Data

Nov. 16, 1988 [JP] Japan .................. 63-289763

[51] Int. Cl.$^5$ .............................. H02H 6/00
[52] U.S. Cl. ...................... 363/50; 361/87; 361/99; 340/664
[58] Field of Search ............... 363/50; 361/62, 63, 361/87, 93, 96, 99; 340/664, 650, 651

[56] References Cited

U.S. PATENT DOCUMENTS 4,710,845 12/1987 Demeyer ............... 361/96
4,780,786 10/1988 Weynachter et al. ......... 361/87
4,819,124 4/1989 Arinobu ............... 361/87

FOREIGN PATENT DOCUMENTS 0284198 9/1988 European Pat. Off. .
2055263 2/1981 United Kingdom .
2073969 10/1981 United Kingdom .
2073973 10/1981 United Kingdom .

Primary Examiner—Peter S. Wong
Attorney, Agent, or Firm—Staas & Halsey

[57] ABSTRACT

In this power control apparatus, a current flowing in a main current (201) is detected by a current transformer (202) and a zero-phase current transformer (203), provided in the main circuit. A value of this current is provided to a CPU (214) included in an intelligent controller (207). A maximum peak value and the like are evaluated by the CPU to be compared with predetermined set values. If those values are equal to or higher than the set values, an excitation signal is applied to a tripping device (205) to release a latch by a latch scheme (206) and thus to trip the circuit breaker. The CPU alters the set value when supplied with a setting alteration instruction from a central monitor (40), and causes the circuit breaker to be tripped when supplied with a stop instruction therefrom.

7 Claims, 5 Drawing Sheets

FIG. 2
FIG. 3
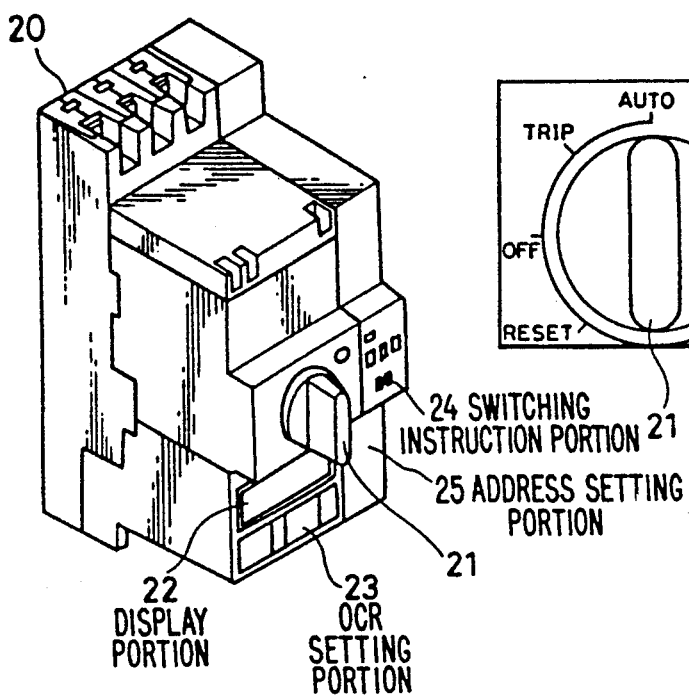
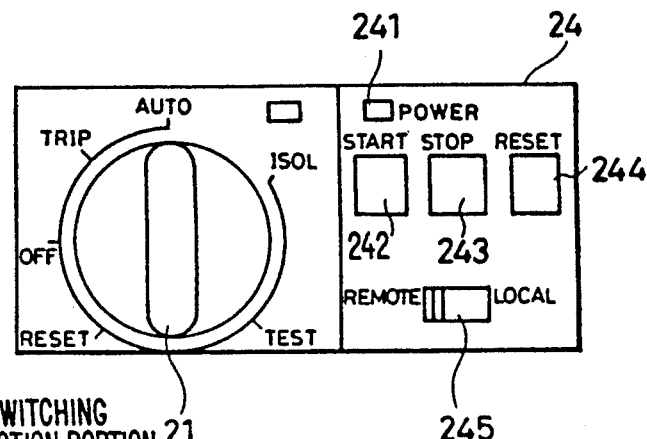
FIG. 4
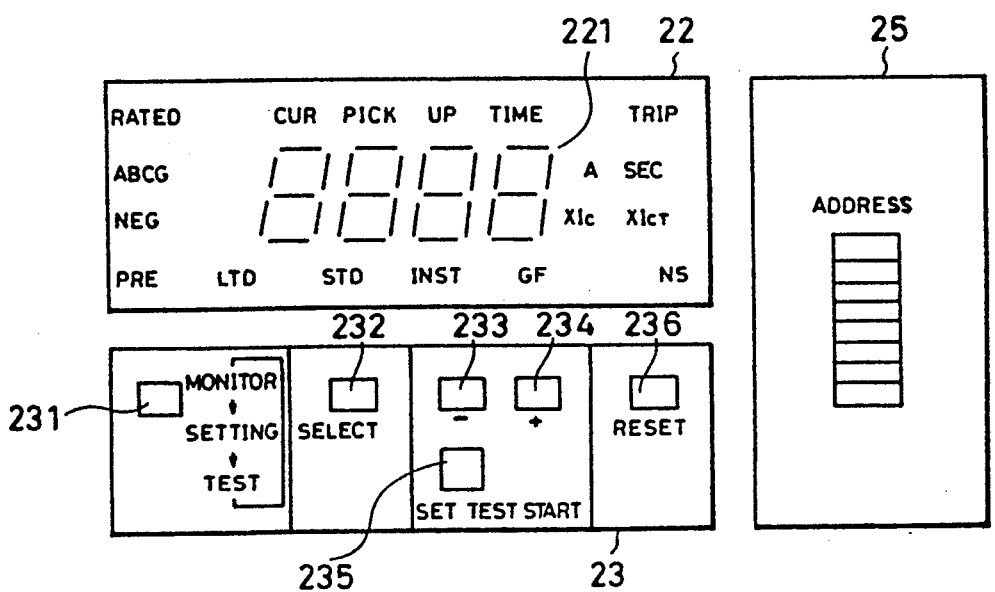

POWER CONTROL APPARATUS

BACKGROUND OF THE INVENTION

1. Field of the Invention

The present invention relates generally to power control apparatuses. More particularly, it relates to a power control apparatus, in which a load such as a motor is connected to a main, circuit, for monitoring an overload or a short circuit thereby to break the main circuit in accordance with an electric current flowing in the main circuit.

2. Description of the Background Art

FIG. 6 is an electrical circuit diagram of a general motor starter. As shown in this figure, a three-phase main circuit 1 is connected to a circuit breaker 2, such as a molded-case circuit breaker or a ground-fault circuit interrupter (an earth leakage breaker), a magnet contactor 3, a thermal relay 4, and a load 13. An ammeter 12 is provided with a current transformer 11 coupled to one phase of the main circuit 1. The circuit breaker 2 serves to automatically break the main circuit 1 when a large current such as a short-circuit current flows or when a leak occurs. Normally, frequent switchings of the flow of a normal current is carried out by the magnet contactor 3 while the circuit breaker 2 is in the closed state.

The magnet contactor 3 connects the main circuit to the load 13 when a closing button 7 is operated. The thermal relay 4 opens a contact 5 while an overcurrent flows for a certain period or more, and then deenergizes an excitation coil (MG) 6 of the magnet contactor 3 to open the main circuit 1. On the other hand, closing the closing button 7 causes a current to flow from a power source 10 through the contact 5 of the thermal relay, the excitation coil 6, the closing button 7 and the opening button 9, and thus causes the excitation coil 6 to be energized and the magnet contactor 3 to be closed. Accordingly, a self-hold contact 8 of the magnet contactor 3 is closed to supply a current to the load 13.

Operation of the opening button 9 causes the circuit to be opened and the excitation coil 6 to be deenergized, and then the magnet contactor 3 is opened, so that a current flowing to the load 13 such as a motor is interrupted.

The individual components such as the circuit breaker 2, the magnet contactor 3, the thermal relay 4 and the current transformer 11 shown in FIG. 6 are provided on a common base and wired therebetween. However, since those individual components are manufactured by different manufacturers, their dimensions and mounting wirings are not the same. Therefore, professional knowledge is required to assemble those components, and thus there is a limitation in miniaturizing the components as a whole in unitary device. Further, for a centralized control of many starters, a starter panel for mounting each starter thereon is required. Further, there is a disadvantage that the conventional starter is unsuitable for a distributed control installation in which each device is controlled individually.

SUMMARY OF THE INVENTION

It is a principal object of the present invention to provide a power control apparatus applicable to both centralized control and distributed control and capable of easily monitoring an overload or a short circuit in accordance with a current flowing in a main circuit thereof.

Briefly, according to the present invention, a circuit breaker for breaking a main circuit when troubles, such as over-currents or the like, occur and which is opened and closed by an electromagnet, and a current transformer for detecting a current flowing in the main circuit are provided in the main circuit which is formed of a plurality of phases. When an output current of the current transformer is supplied to a signal generation circuit, the signal generation circuit generates a signal in accordance with the current flowing in the main circuit and also generates an output signal under a predetermined condition in accordance with the current flowing in the main circuit being higher than or equal to a predetermined value. A tripping device causes the circuit breaker to break the main circuit in accordance with the output signal from the signal generation circuit. When a communication signal for at least a switching instruction is applied from an external control device to a communication circuit, a switching control circuit causes the circuit breaker to open and/or close, and a display displays thereon a current value based on a signal generated in accordance with the current flowing in the main circuit. A predetermined value and a predetermined condition set by a setting circuit are displayed on the display and also set in the signal generation circuit.

Therefore, according to the present invention, integrally forming the circuit breaker, the current transformer, the signal generation circuit, the communication circuit for at least switching control and the like allows this power control apparatus to require a smaller space for installation and to be implemented by a simpler manufacturing operation, and also permits it, regardless of its size, to meet requirements of both the centralized and distributed control systems and various operation systems such as a remote control operation and a centralized control operation. Furthermore, it is possible for this power control apparatus not only to set the predetermined value and condition in the signal generation circuit which also displaying same on the display, but also to monitor the current in the main circuit.

In a preferred embodiment of the present invention, a switching instruction circuit for providing a switching instruction is provided, so that the switching control circuit controls the switching of the circuit breaker in accordance with the instruction from the switching instruction circuit or an instruction from the communication circuit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an exterior perspective view illustrating the entire configuration of the embodiment of the present invention;

FIG. 3 is a view illustrating a handle and a switching instruction portion provided in a power control apparatus shown in FIG. 2;

FIG. 4 is a view illustrating a display portion, an OCR setting portion and an address setting portion, provided in the power control apparatus shown in FIG. 2;

DESCRIPTION OF THE PREFERRED EMBODIMENTS

Figure 1A:
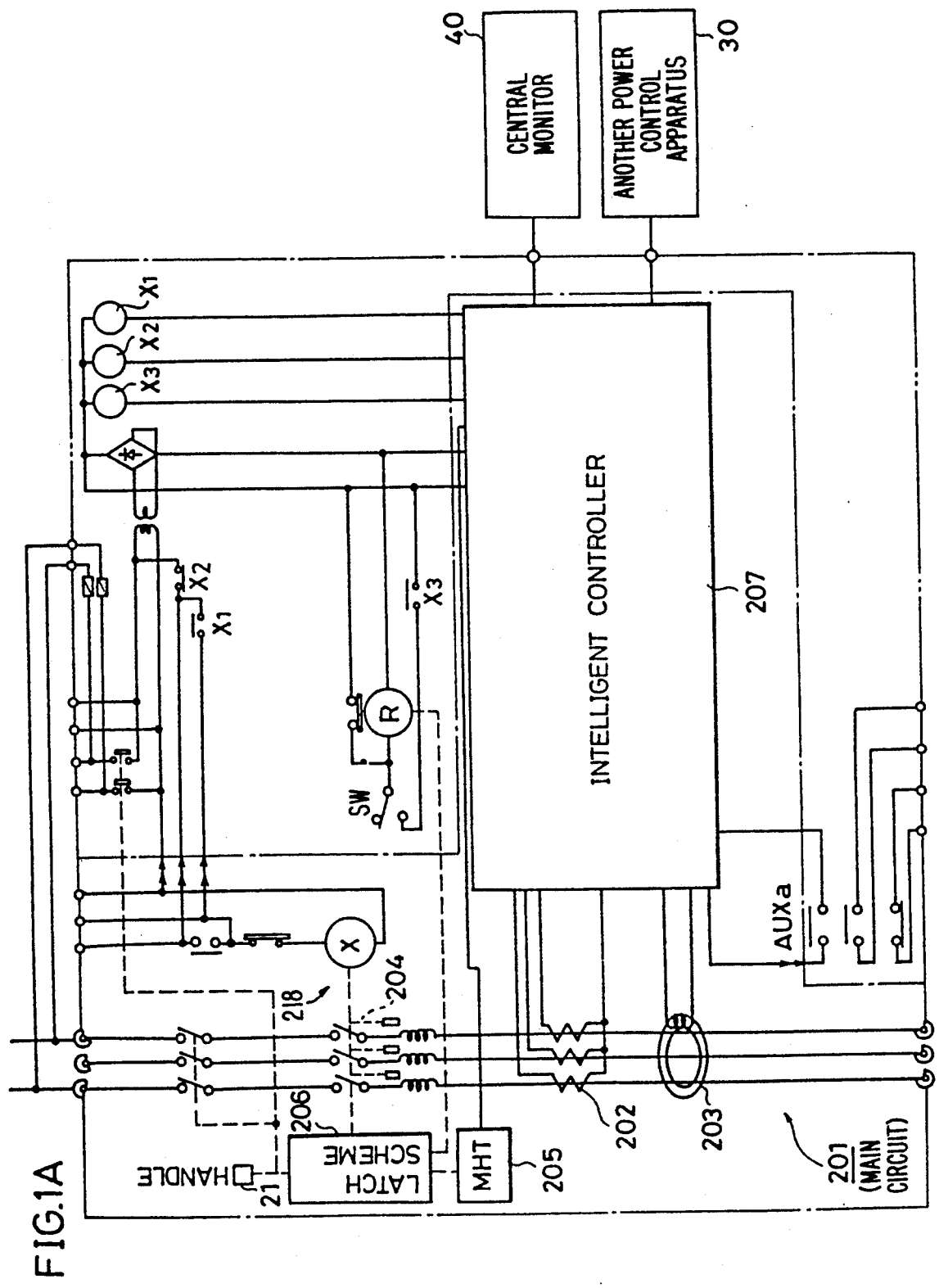
FIGS. 1A and 1B are entire electric circuit diagrams of an embodiment of the present invention.

FIG. 2 is an exterior view illustrating the entire configuration of an embodiment of the present invention; FIG. 3 is a view illustrating a handle and a switching instruction portion, provided in a power control apparatus shown in FIG. 2; FIG. 4 is a view illustrating a display portion, an OCR (Over-Current-Relay) setting portion and an address setting portion, provided in the power control apparatus.

An exterior structure of the embodiment of the present invention will first be described with reference to FIGS. 2-4 and related to the block diagram of FIGS. 1A and 1B. The power control apparatus 20 according to the present invention comprises circuit breaker means 204 operable, in response to the detection of shorts of a main circuit, overloads, and the like, for switching a load if necessary the apparatus 20 comprises on its front side a handle 21, a display portion 22, an OCR setting portion 23, a switching instruction portion 24, and an address setting portion 25. The handle 21 serves to reset a tripping device. The display, portion 22, as shown in FIG. 4, provides for display of values of a rated current (RATED CUR), a pickup (PICK UP), time (TIME), a trip (TRIP), a phase (ABCG), a negative phase (NEG), a pre-trip (PRE), a long time delay (LTD), a short time duration (STD), an instantaneous trip current (INST), a ground fault (GF), a negative phase (NS), a current (A), second (SEC), a multiplying factor ($xI_c$) representing, for example, how many times a set value, to be displayed in a longtime delay, is as large as a rated current, and a numeral display portion 221.

The OCR setting portion 23 comprises buttons 231-236. A display mode changing button 231 serves to selectively change the display mode in accordance with the respectively selected minitor mode, setting mode and test mode of operation. A select button 232 serves to select the data content displayed on the display portion 22 in the monitor mode and to designate an element in the setting, mode. A minus (−) button 233 and a plus (+) button 234 serve respectively to increase and to decrease a set value. A set/test start button 235 is operated to set a value to the value as increased or decreased by the (−) button 233 or the (+) button 234 respectively. A reset button 236 resets the display of a trip value.

The switching instruction portion 24 comprises an LED 241 for a power display, a start button 242, a stop button 243, a reset button 244, and a remote/local changing switch 245. The start button 242 serves to instruct a closing of the circuit breaker means 204; the stop button 243 serves to instruct an opening of the circuit breaker means 204; and the reset button 244 serves to instruct the reset of the latch mechanism associated with the 206 tripping device 205 the latter (MHT) device 205, when activated, serving to release the latch mechanism 206 and thereby open the contacts of the circuit breaker 204. The remote/local changing switch 245 serves to change a remote switching instruction from select between a central monitor 40 and a local switching instruction from the switching instruction portion 24.

Figure 1B:
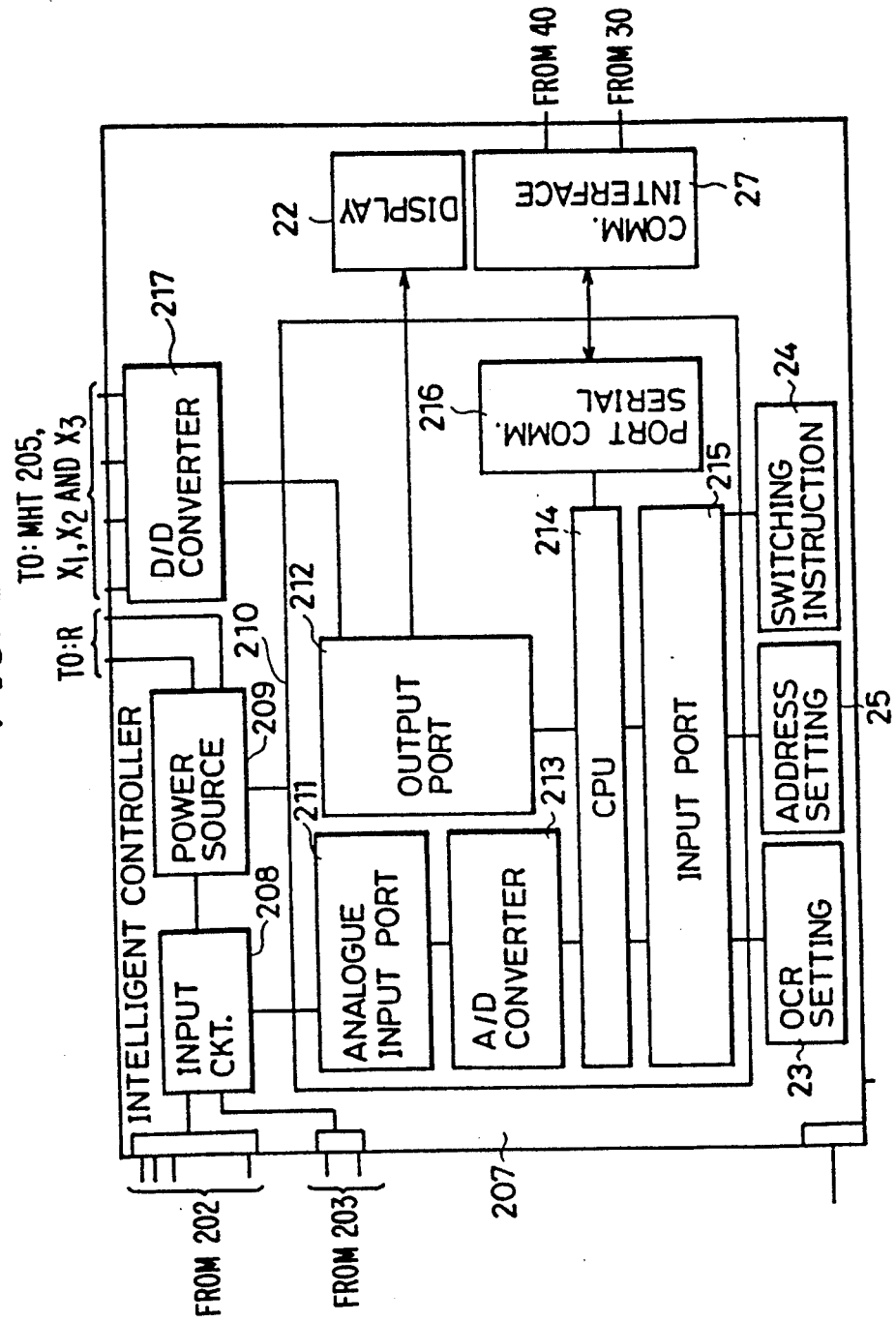

FIGS. 1A and 1B are electrical circuit diagrams of one embodiment of the present invention. A principal electrical configuration of the embodiment of the present invention will now be described with reference to FIGS. 1A and 1B. A main circuit 201 comprises the circuit breaker means 204, a current transformer 202 and a zero-phase current transformer 203. The circuit breaker means 204 has its contacts selectively opened or closed by magnetic switching means 218 including a coil X, under the condition of the latch mechanism 206 being reset. When the tripping device 205 operates, the latch mechanism 206 is released, thereby to open the contacts of the circuit breaker means 204. The latch mechanism 206 can be reset by operation of the handle 21 and by energization of the electrical means R (e.g., a motor) in response to an output from controller 207 through relay $X_3$ and its (closed) contacts $X_3$ (when switch SW is closed). The current transformer 202 and the zero-phase current transformer 203, shown in FIG. 1B, are connected to an input circuit 208 of an intelligent controller 207. The input circuit 208 converts a current input from the current transformer 202 and from the zero-phase current transformer 203 into a voltage input of an appropriate level for application as an input to a microcomputer 210, and also charges a power circuit 209.

The microcomputer 210 is a one-chip microcomputer having an A/D converting function and a communication function as well. This microcomputer 210 comprises an analog input port 211, an output port 212, an A/D converter 213, a CPU 214, an input port 215, and a serial communication port 216. The analog input port 211 is connected to the input circuit 208; the output port 212 is connected to a digital/digital (D/D) converter 217 and to the display portion 22; and the input port 215 is connected to the OCR setting portion 23, the switching instruction portion 24 and the address setting portion 25. The serial communication port 216 is connected to a communication interface 27. The D/D converter 217 provides an output to the tripping device/MHT (Magnet Hold Trigger) 205 for tripping the circuit breaker means 204 and to relays X1, X2 and X3 for switching or resetting. The address setting portion 25 serves to set an address for designating a device which is to receive and accordingly is receiving an instruction from the central monitor 40. The A/D converter 213 serves to convert an analog signal from the analog input port 211 into a digital signal and to apply the digital signal to the CPU 214. The CPU 214 serves to control the entire operation of the power control apparatus according to the present invention, and is controlled by a program based on a flow chart shown in FIG. 5.

The central monitor 40 and the intelligent controller 207 are coupled by a non-synchronized communication line through the communication interface 27. Information from the intelligent controller 207 is sent to the central monitor 40 in accordance with a requirement, and a setting alteration, a start instruction, a stop instruction and a reset instruction from the central monitor 40 are transmitted to the intelligent controller 207. The reference number 30 denotes another power control apparatus which is different from the power control apparatus of this invention and is separated from the central monitor 40 by an address setting.

Figures 5A, 5B, 5C:
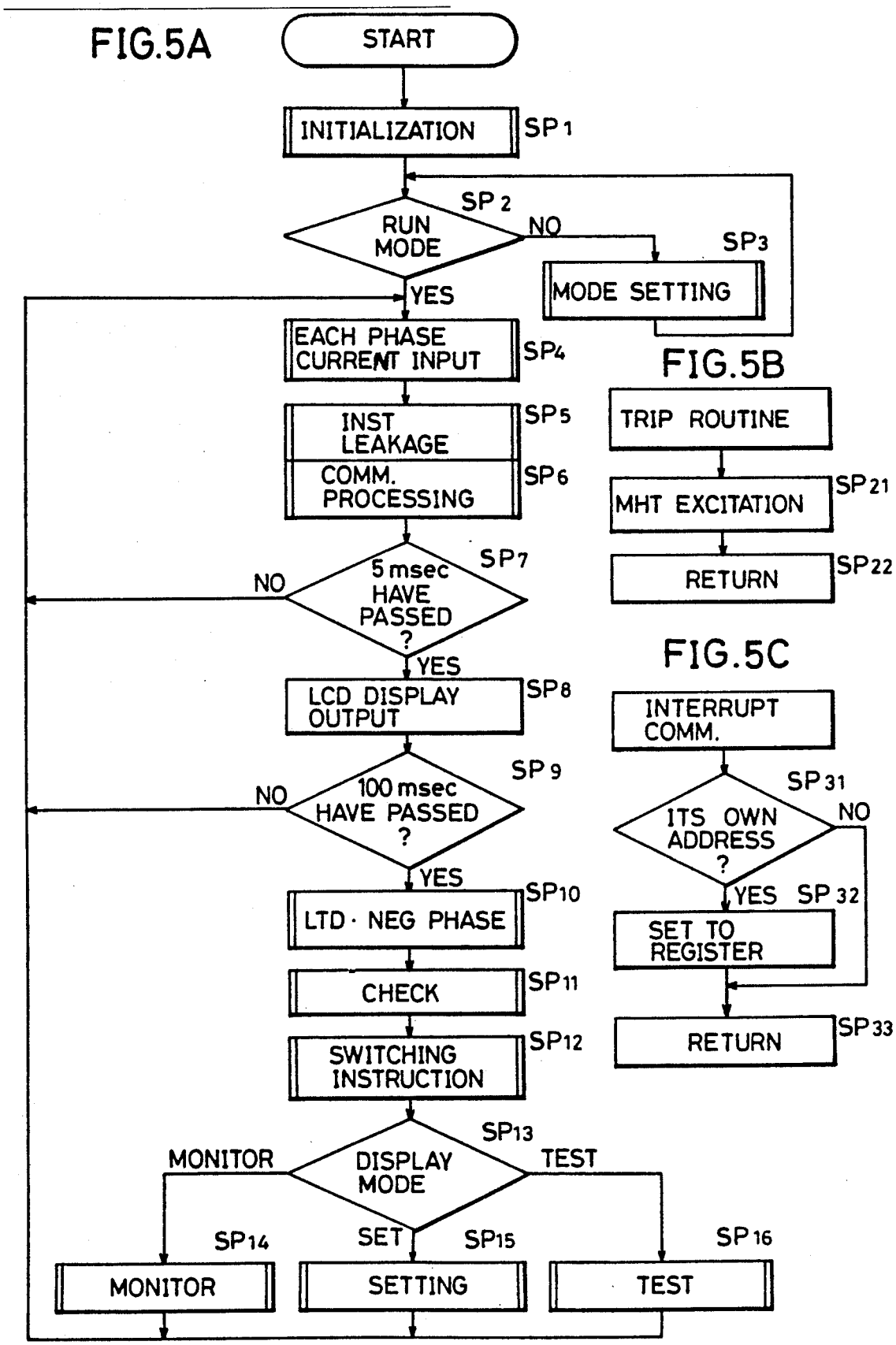
FIGS. 5A to 5C are flow charts for describing an operation of the embodiment of the present invention.
Figure 6:
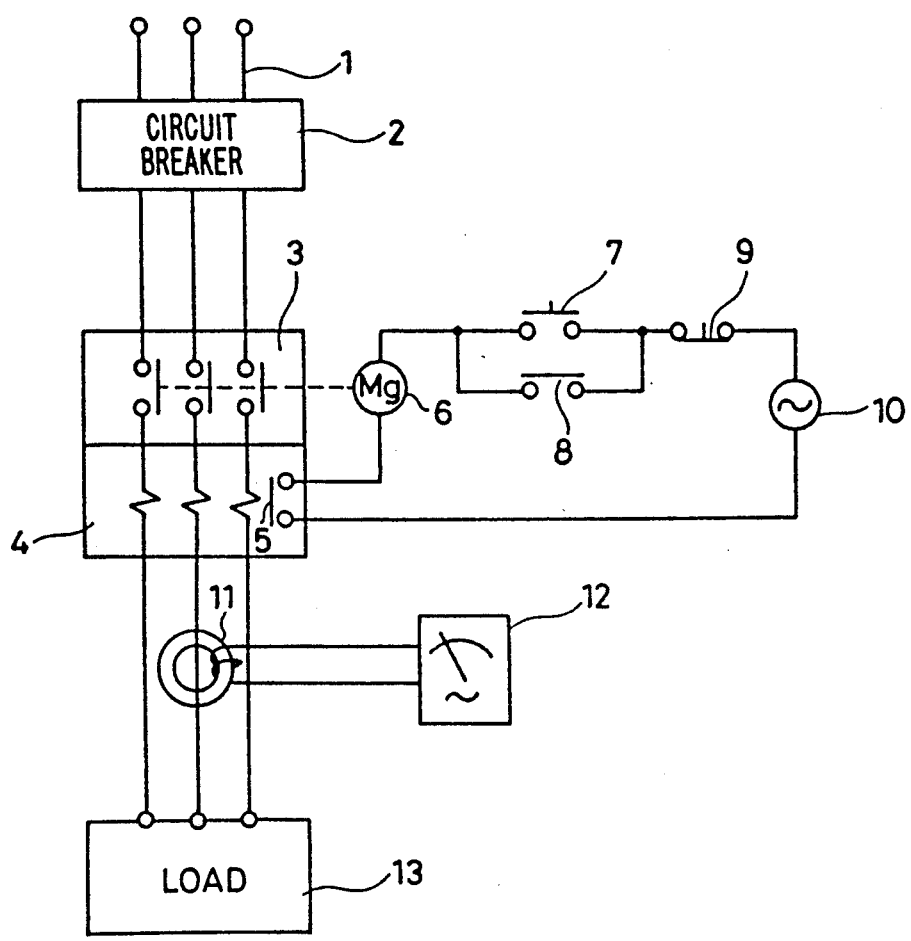
FIG. 6 is an electrical circuit diagram of a conventional motor starter.

FIGS. 5A-5C are flow charts for describing a detailed operation of the embodiment of the present invention.

The detailed operation of the embodiment of the present invention will be described with reference to FIGS. 1-5C. With application of the power, a program starts, and initializations of a memory included in the CPU 214 and the ports 211, 212, 215 and 216 are performed in step (referred to as SP in the figures) SP1. In step SP2, the CPU 214 determines if a RUN mode is set. If it is not the RUN mode but a mode setting, specifications of relays, the rated currents of the current transformers and the like are written in a non-volatile storage included in the CPU 214, in a factory, in step SP3.

If it is the RUN mode, each phase current is inputted in step SP4. That is, each current value, as detected by the current transformer 202 and by the zero-phase current transformer 203, is inputted to the input circuit 208, converted into a voltage of an appropriate level by the analog input port 211 and further converted into a digital signal by the A/D converter 213, and supplied to the microcomputer 210. In response to this inputting, the microcomputer 210 inputs instantaneous values of each phase current and a leakage current, evaluates its square accumulation value maximum peak value, and stores the evaluated values in a predetermined register in the CPU 214. In step SP5, the CPU 214 compares (CMPR) the maximum peak values of each phase current and the leakage current with respective set values of INST and leakage (i.e., instantaneous trip and leakage current set values, respectively, at which a trip function is to be initiated. If the maximum peak values are equal to or higher than the set values, the CPU 214 writes trip data such as a trip value, a time duration and a cause of the trip into the predetermined register thereby to call a TRIP routine shown in FIG. 5B.

After calling the TRIP routine, the CPU 214 outputs a trip instruction through the output port 212 and the D/D converter 217 (and for MHT Excitation) in step SP21, and returns to the first program in step SP22. After the tripping device (MHT) 205 is excited for 10 msec, the latch state of the latch mechanism 206 is released, so that the circuit breaker means 204 is tripped. If there is any interruption with communication, the CPU 214 interrupts the normal routine and proceeds to the routine shown in FIG. 5C, and, in step SP31, decides if the sent address belongs to itself. If the sent address belongs to the CPU 214 itself, the CPU 214 carries out setting of a status register in accordance with step SP32 and returns to the original program in step SP33.

In communication processing, in step SP6, the CPU 214 carries out transmission of data or the set value in accordance with a communication status register and writing of them into a setting alteration register and a switching instruction register. The CPU 214 decides if 5msec have passed in step SP7. If 5msec have not passed, it returns to step SP4 and then repeats the operations of steps SP4 to SP7. If 5 msec have passed, it proceeds to step SP8. The numeral display portion 221 displays each data shown in FIG. 4 by dynamic lighting carried out every 5 msec, e.g., by an LCD (liquid crystal display) device.

Next, in step SP9, the CPU 214 decides whether or not 100 msec have passed. If 100 msec have not passed, the CPU 214 repeats the operations of steps SP4 to SP9 and again receives the instantaneous values of each phase current and a leakage current to carry out the communication processing. If the CPU 214 decides that 100msec have passed, it carries out LTD negative phase processing in step SP10. That is, the CPU 214 compares a maximum value of an RMS (root means square) value of each phase with a rated current. The CPU 214 thus starts time counting if the maximum value of the RMS value of each phase is equal to or higher than the rated current and calls a trip routine after a predetermined time period to trip the circuit breaker means 204. Similarly, the CPU 214 compares a negative phase current with its set value, and if the negative phase current is equal to or higher than the set value, the CPU 214 starts time counting and calls a trip routine after a predetermined time period to trip the circuit breaker means 204.

The CPU 214 then proceeds to a check routine in step SP11. In the check routine, the CPU 214 carries out processing for detecting abnormality of an analog circuit or a disconnection of the tripping device 205. The CPU 214 then proceeds to a serial data input/output routine and further to a switching instruction routine. If the remote/local changing switch 245 is changed to the remote, the D/D converter 217 outputs a driving signal for driving the relay X1 under the condition that a bit of the switching instruction register written by the communication processing represents the closed state. This causes the contact X1 to be closed and the relay coil X to be driven, and thus causes the circuit breaker means 204 to be in the closed state. On the other hand, the intelligent controller 207 outputs a driving signal for driving the relay coil X2 while a bit of the switching instruction register is in the opened state. This causes the contact X2 to be opened and the relay coil X not to be driven, and thus causes the circuit breaker means 204 to be in the opened state.

Further, when the start button 242 is operated with the remote/local changing switch 245 changed to the local position, the intelligent controller 207 similarly outputs a driving signal for driving the relay coil X1. The contact X1 is then closed and the relay coil X is driven to allow the circuit breaker means 204 to be in the closed state. With the operation of the stop button 243, the relay coil X2 is driven and the circuit breaker means 204 is opened.

Next, when the display mode changing button 231 shown in FIG. 4 selects the monitor mode, the CPU 214 decides that the display mode is in the monitor mode in step SP13, then outputs data corresponding to a current designated by the select button 232 to the input port 215, and displays the data as a numeric value on the numeral display portion 221 shown in FIG. 4.

When the display mode changing button 231 selects the setting mode, the CPU 214 decides that the display mode is in the setting mode, outputs the set value of an element designated by the select button 232 to the input port 215 in step SP15, and displays the same on the numeral display portion 221. If the (−) button 233 or the (+) button 234 is operated at this time, the CPU 214 alters a display of the set value on the numeral display portion 221. If the set button 235 is operated to alter the set value to the displayed value, the CPU 214 stores the altered set value in the register. If the reset button 236 is operated, the CPU 214 clears the content of the register storing the set value.

Further, when the display mode changing button 231 selects the test mode, the CPU 214 proceeds to the test mode of the element designated by the select button 232 in step SP16. If the (−) button 233 or the (+) button 234 is operated at this time, an arbitrary pseudo-input is displayed as a numeric value on the numeral display portion 221. With the operation of the set/test start button 235, the input thereof is actually applied, so that a test is started.

As has been described, according to the embodiment of the present invention, since the power control apparatus can include necessary elements with extreme compactness and has even a function of communication, wirings can be completed in practical use only by wiring between the power source and the load and by coupling the central monitor 40 through the communication line if necessary. Furthermore, after installation of the power control apparatus, it is possible to freely set a characteristic value in accordance with a load and to freely set an address, so that it is possible to accommodate any load with the same unit.

Therefore, unlike to the conventional control board, it is unnecessary to carry out a combination wiring by selecting a large number of control apparatuses such as circuit breakers with capacities suitable for respective apparatuses to be provided, so that the same method of wiring is employed after provision of the apparatuses even under different control conditions of the loads. In addition, since all the necessary devices are included compactly in the apparatuses, there is no limitation as to location and space for provision of the apparatuses, and thus it is also possible to provide many units, centralized or distributed near the load. Furthermore, it is possible to carry out centralized monitoring and remote controlling of a number of power apparatuses, and thus it is unnecessary to design each apparatus to be installed for each building or factory.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power control apparatus for controlling the supply of plural phase electrical power to a main circuit, comprising:
    circuit breaking means having contacts connected in said main circuit and selectively operable to close said contacts for supplying said electrical power to said main circuit and to open said contacts and thereby break the supply of electrical power to said main circuit, and to switch said contacts between open and closed conditions;
    means for detecting the present level of current flowing in said main circuit and providing a corresponding, current level detection output;
    setting means for setting a predetermined current level value and predetermined conditions relating to breaking of the main circuit when the present current level exceeds the predetermined current level set value;
    means for supplying switching instructions for switching of said circuit breaking means;
    control means responsive to said switching instructions for controlling said circuit breaking means to switch between said open and closed conditions of said contacts and further responsive to the set values of said setting means and the current level detection output of said detecting means for generating a current level monitor signal and, in response to the current level in said main circuit exceeding said predetermined current level set value, for generating an output signal in accordance with said predetermined conditions;
    tripping means, responsive to the output signal of said control means, for operating said circuit breaking means to break the main circuit; and
    display means for receiving and displaying the predetermined current level set value from the setting means and for receiving the current level monitor signal output of said control means and displaying the corresponding present main circuit current value.

2. A power control apparatus as recited in claim 1, wherein said switching instruction supplying means comprises communication means for receiving switching instructions from source means, external of said apparatus, for supply to said control means, said control means responding to said externally supplied switching instructions for controlling the operation of said circuit breaking means for switching said contacts thereof between said open and closed conditions.

3. A power control apparatus as recited in claim 1, wherein said circuit breaking means comprises:
    mechanical latch means having reset and released conditions and operable in said reset condition to permit said circuit breaking means to switch the contacts thereof to said closed condition; and
    said mechanical latch means being operated by said tripping means to said released condition for, in turn, operating said circuit breaking means to break the main circuit.

4. A power control apparatus as recited in claim 3, further comprising means for resetting said latch means.

5. A power control apparatus as recited in claim 4 wherein said resetting means comprises manual resetting means.

6. A power control apparatus as recited in claim 4 wherein said resetting means is responsive to and operated by an output of said control means.

7. A power control apparatus as recited in claim 6 wherein said circuit breaking means is operable in response to an output signal of said control means, in the reset condition of said latch means, for switching said contacts thereof to said closed condition.

* * * * *